(12) United States Patent
Kunysz

(10) Patent No.: US 6,750,816 B1
(45) Date of Patent: Jun. 15, 2004

(54) INTEGRATED GPS-INERTIAL SYSTEM

(75) Inventor: Waldemar Kunysz, Calgary (CA)

(73) Assignee: NovAtel, Inc., Calgary (CA)

( * ) Notice: Subject to any disclaimer, the term of this patent is extended or adjusted under 35 U.S.C. 154(b) by 0 days.

(21) Appl. No.: 10/365,281

(22) Filed: Feb. 12, 2003

(51) Int. Cl.$^7$ ............................. G01S 5/02; H04B 7/185
(52) U.S. Cl. ........................... 342/357.14; 342/357.06; 701/220
(58) Field of Search ...................... 342/357.14, 357.06, 342/357.12; 701/213, 220

(56) References Cited

U.S. PATENT DOCUMENTS 5,459,763 A * 10/1995 Hori et al. ............... 375/354
6,448,926 B1 * 9/2002 Weinberg et al. ...... 342/357.06
6,520,448 B1 * 2/2003 Doty et al. ............... 244/3.23

* cited by examiner

*Primary Examiner*—Theodore M. Blum
(74) *Attorney, Agent, or Firm*—Cesari and McKenna, LLP

(57) ABSTRACT

A GPS-inertial system that is suited to new installations as well as the retrofitting of GPS receivers includes inertial sensors that are incorporated into the housing of the GPS antenna. The outputs of the inertial sensors are modulated onto a radio frequency carrier that has the same frequency as the GPS carrier, using the same data modulation arrangement as that used by the GPS system. The inertial measurements are thus sent to the receiver on the same cable as the RF signals from the antenna, and the receiver recovers the data from the sensor signals with the same arrangement that is used for data recovery from GPS position signals. Consequently, software modifications of existing GPS receivers can provide position and velocity estimates generated from the outputs of the inertial sensors.

6 Claims, 1 Drawing Sheet

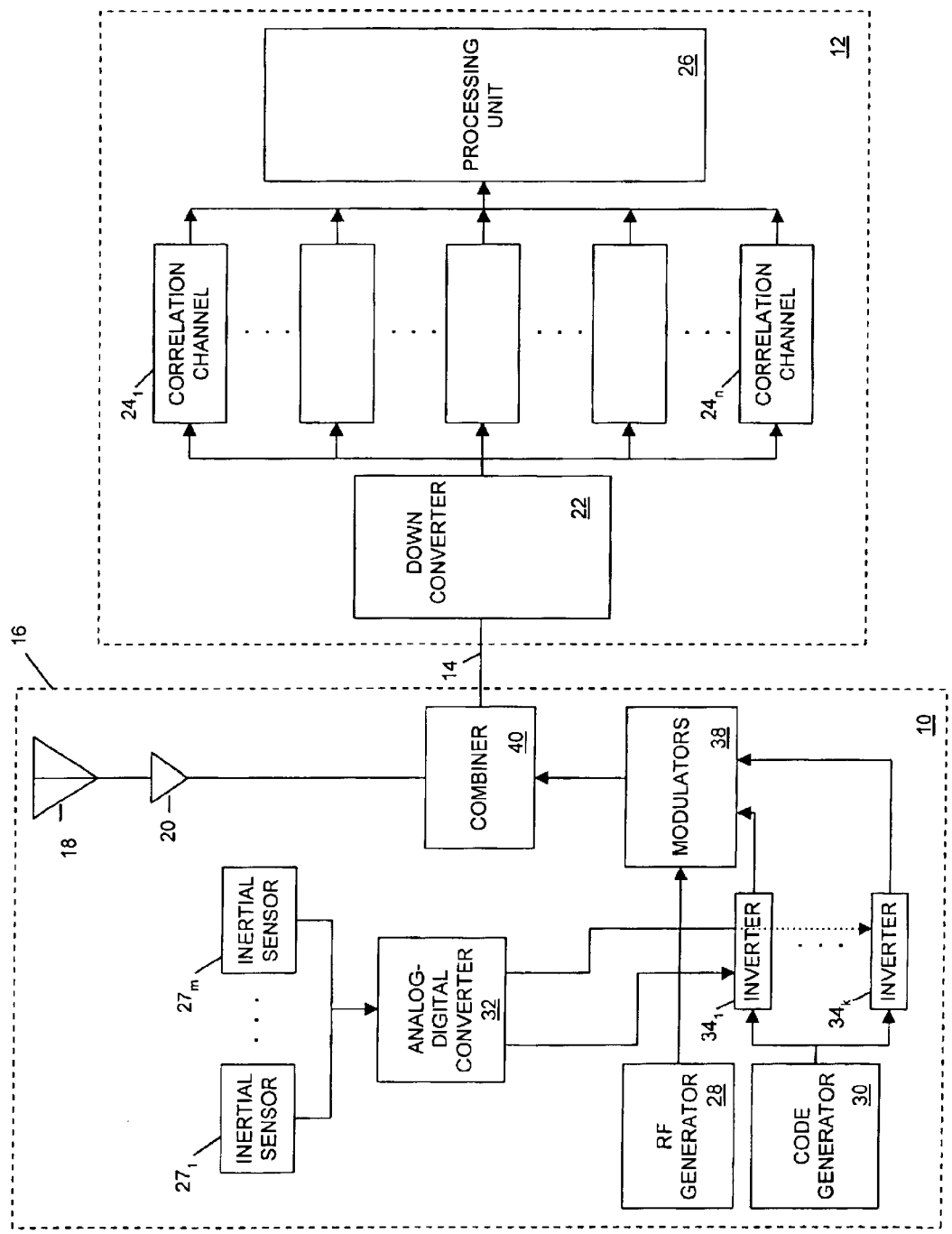

INTEGRATED GPS-INERTIAL SYSTEM

BACKGROUND OF THE INVENTION

Field of the Invention

This invention relates to a combined GPS-inertial position locator. More specifically, it relates to a system in which inertial sensors are disposed in the antenna unit connected to a GPS receiver.

In recent years, Global Positioning System (GPS) receivers have been combined with inertial sensors to provide reliable position estimates that are updated at relatively short intervals. Specifically, GPS receivers are inherently capable of position estimates that are more accurate than those obtained from inexpensive inertial sensors. However, when disposed in a moving vehicle, GPS receivers suffer from dropouts when the signals received from the orbiting GPS satellites are attenuated by natural terrain features such as trees and hills or by man-made features such as buildings and tunnels. Moreover the GPS system provides position updates at a rate that is too slow for use in some control systems such as aircraft autopilots.

Inertial sensors, on the other hand, do not suffer from these problems, but, when implemented with inexpensive components, they provide position estimates that are much less accurate than GPS-leased estimates.

Accordingly, the two systems have been combined, with the GPS position updates being used to calibrate the inertial sensors. The sensor outputs can thus be mathematically integrated to provide accurate position estimates at a rate sufficient for use in most control systems. Moreover, they retain their calibrations for a sufficient duration to provide accurate estimates during GPS signal dropouts.

SUMMARY OF THE INVENTION

The invention is directed to an inexpensive GPS-inertial system that is suited to new installations as well as the retrofitting of GPS receivers without undue modification of existing equipment. Specifically the inertial sensors are incorporated into the housing of the GPS antenna, where their outputs are modulated onto a radio frequency carrier that has the same frequency as the GPS carrier, using the same data modulation arrangement as that used by the GPS system.

The inertial measurements can thus be sent to the receiver on the same cable as the RF signals from the antenna. Moreover, the receiver can recover the data from the sensor signals with the same arrangement that is used for data recovery from position GPS signals. Consequently, software modifications of existing GPS receivers can provide position and velocity estimates generated from the outputs of the inertial sensors.

BRIEF DESCRIPTION OF THE DRAWINGS

The invention description below refers to the accompanying drawing, which is a diagram of a position-estimating system incorporating the invention.

DETAILED DESCRIPTION OF AN ILLUSTRATIVE EMBODIMENT

As shown in the drawing, an antenna unit 10 is connected to a receiver 12 by a transmission line cable 14. As with conventional GPS receiving systems, the antenna unit includes a housing 16 containing an antenna 18 suitable for a reception of ranging signals from satellites and pseudo-satellites. The signals received by the antenna are amplified by a preamplifier 20, whose output is passed by the cable 14 to the receiver 12.

The receiver 12 includes a down converter 22 that converts the high frequency signals received over the transmission line 14 to an intermediate frequency. The output of the converter 22, in turn, is passed to a plurality of correlation channels $24_1 \ldots 24_n$. Under control of a processing unit 26 each of the channels 24 demodulates the signal that is transmitted by a particular signal source, i.e., satellite or pseudo-satellite in a conventional system, and the resulting timing information is used by processing unit 26 to estimate the position of the receiver or, more accurately, the antenna 18.

More specifically, as configured for use with satellite ranging systems such as the GPS system, each of the channels 24 is assigned a replica of the pseudo-random code used by a satellite in modulating the RF carrier transmitted by that satellite, the channel correlates that replica with the signal to demodulate the signal from the satellite. Each satellite further modulates its transmitted signal with satellite data such as identification of the satellite and information about its orbital position. In the present GPS system this data is transmitted at a rate of 50 bits per second by inverting or not inverting the pseudo random code according to whether the value of each bit is a zero or a one. These bits are recovered by the demodulation process and used by the processing unit 26 uses them, along with the timing of the replica code distance from the satellite in calculating the position of the receiver.

In accordance with the invention, the antenna housing 16 also contains a set of inertial sensors $27_1 \ldots 27_m$. These sensors may include any combination of accelerometers, gyros, etc. whose outputs can be mathematically processed to provide position information and, if desired, velocity, acceleration and bearing information. The outputs of these sensors are used to modulate an RF carrier, provided by an RF generator 28, that has the same frequency as the common carrier frequency of the orbiting satellites, the resulting signals being passed through the cable 14 to the receiver 12, where they are demodulated by channels 24 assigned to that task by the processing unit 26.

More specifically the antenna enclosure 16 also includes code generators 30 that generate unique pseudo random codes having the same length and chip rate as the pseudo random codes used by the orbiting satellites. The outputs of the inertials sensors 27 are digitized by one or more analog-digital converters 32 and the resulting signals are applied to controllable inverters $34_1 \ldots 34_K$ to modulate the pseudo random codes from the generators 30 in the same manner that the codes used by the orbiting satellites are modulated with the data transmitted by those satellites. The outputs of the inverters, in turn are applied to modulators 38 that phase-modulate the output of RF generator 38. The modulated carriers are combined with the output of the amplifier 20 in a signal combiner 40.

In the receiver 12 the software (or firmware) in the processing unit 26 assigns to some of the channels 24 the pseudo random codes associated with the inertial data provided by the sensors 26. These channels operate as in their normal manner to demodulate the signals carrying these data so that the processing unit 26 receives inertial data along with the data derived from the signals transmitted by the satellites. In a well known manner the position information derived from the satellite signals is used to calibrate the inertial data. The inertial data thus has a relatively high degree of accuracy even if inexpensive and nominally inaccurate sensors are used.

The foregoing operation of the receiver 12 is governed by the software incorporated in the processing unit. 26. Accordingly a pre-existing receiver easily can be modified to operate in accordance with the invention by loading in with the appropriate software.

Although, the bit rate of the data transmitted by the GPS satellite is (50 bps) used in the GPS system. A receiver configured for reception of GPS signals is capable of recovering data received at a rate of upwards of 500 to 1,000 bps per channel. Preferably the system described herein uses such a bit rate.

Assume for example the use of inertial sensors that provide three-axis angle and acceleration data. Further assume that one of the channels is assigned to each parameter and that each parameter provides four bytes of data along with two bytes for a header and a check sum. This results in a requirement of 6 bytes (48 bits) of information per digital channel. With a channel bit rate of 1,000 bps this translates to approximately 20 inertial updates per second. If the data is compressed with an efficiency of 50 percent the system will provide data at a rate of approximately 40 Hz. This is well within the requirements of most control systems that rely on position and velocity information.

What is claimed is:

1. A receiver for the demodulation and processing of ranging signals and from orbiting satellites, the receiver comprising:
   A) multiple channels, each of which is configured to demodulate said ranging signals and recover satellite data from said signals;
   B) control means for
      a. assigning to each a channel a signal source whose signals are to be demodulated in that channel, and
      b. processing data received from the ranging signals;
   C) an RF generator that has the same frequency as the satellite carrier frequency,
   D) modulating means for modulating the output of said generator with unique pseudo random codes and modulating the codes with associated inertial data to produce pseudo ranging signals, and
   E) the receiver channels correlate the ranging and pseudo ranging signals received by the receiver with local replicas of the pseudo random codes used by the modulating means and the satellites with the control unit assigning said channels to respective signal sources by selecting the code replicas used by said channels.

2. A remote antenna unit for connection by an RF link to a receiver that demodulates and processes ranging signals transmitted by orbiting satellites, said antenna unit comprising:
   A) an antenna for receiving said ranging signals, coupled to said RF link for transmission of said ranging signals to said receiver,
   B) a plurality of inertial sensors providing inertial data,
   C) a radio frequency generator, and
   D) means for modulating the output of said generator with said inertial data in the same manner as the ranging signals are modulated with satellite data, thereby to provide pseudo ranging signals; and
   E) means coupling the pseudo ranging signals to said RF link for transmission to said receiver.

3. The remote antenna unit of claim 2 wherein the radio frequency generator has the same frequency as the carrier frequency transmitted by the satellites.

4. A receiver system for the demodulation and processing of ranging signals, the receiver system comprising:
   A) multiple channels, each of which is configured to demodulate the ranging signals and recover associated data from the ranging signals;
   B) an RF link to transmit signals to the multiple channels;
   C) an antenna for receiving ranging signals from satellites, the antenna coupled to the RF link for transmission of the ranging signals;
   D) a plurality of inertial sensors providing inertial data;
   E) a radio frequency generator, and
   F) means for modulating the output of the generator with the inertial data in the same manner as the ranging signals are modulated with satellite data, thereby to provide the pseudo ranging signals; and
   G) means coupling the pseudo ranging signals to the RF link for transmission to the multiple channels.

5. The receiver system of claim 4 further including a control unit for
   assigning to each a channel a signal source whose signals are to be demodulated in that channel, the control means assigning to selected channels the signal sources associated with the inertial data; and
   processing the satellite and the inertial data received from the ranging signals.

6. The receiver system of claim 5 wherein
   the RF generator has the same frequency as the satellite carrier frequency,
   the modulating means modulates the output of the RF generator with unique pseudo random codes and modulates the codes with the inertial data,
   the channels correlate the signals received by the receiver with local replicas of the pseudo random codes, and
   the control unit assigns the channels to respective signal sources by selecting the code replicas used by the channels.

* * * * *